(12) United States Patent
Hamilton et al.

(10) Patent No.: US 8,297,355 B2
(45) Date of Patent: Oct. 30, 2012

(54) USING HEAT FROM PRODUCED FLUIDS OF OIL AND GAS OPERATIONS TO PRODUCE ENERGY

(75) Inventors: Walt D. Hamilton, Katy, TX (US); John Penton, Pasadena, TX (US); Karl Kolthoff, Bakersfield, CA (US); Timothy M. Veale, Moorpark, CA (US); Jerry Lomax, Katy, TX (US); David W. Bowers, Bakersfield, CA (US); Peter A. Schrimpf, Katy, TX (US); Lynn Rouse, Humble, TX (US); Myrna Buenviaje, Bakersfield, CA (US)

(73) Assignee: Texaco Inc., San Ramon, CA (US)

( * ) Notice: Subject to any disclaimer, the term of this patent is extended or adjusted under 35 U.S.C. 154(b) by 707 days.

(21) Appl. No.: 12/197,014

(22) Filed: Aug. 22, 2008

(65) Prior Publication Data

US 2010/0192573 A1 Aug. 5, 2010

(51) Int. Cl.
*E21B 36/00* (2006.01)
*E21B 43/24* (2006.01)
*E21B 21/06* (2006.01)
(52) U.S. Cl. ........ 166/267; 166/57; 166/75.12; 166/302
(58) Field of Classification Search .................. None
See application file for complete search history.

(56) References Cited

U.S. PATENT DOCUMENTS

| 4,007,786 | A | 2/1977 | Schlinger |
| 4,104,535 | A | 8/1978 | Bronicki |
| 4,120,158 | A | 10/1978 | Scheinbaum |
| 4,149,385 | A | 4/1979 | Sheinbaum |
| 4,359,092 | A * | 11/1982 | Jones .............. 166/265 |
| 4,542,625 | A | 9/1985 | Bronicki |
| 4,824,447 | A | 4/1989 | Goldsberry |
| 5,461,876 | A * | 10/1995 | Dressler .......... 62/160 |
| 5,660,042 | A | 8/1997 | Bronicki et al. |
| 6,375,907 | B1 * | 4/2002 | Gallup ........... 423/571 |
| 6,571,548 | B1 | 6/2003 | Bronicki et al. |
| 7,340,897 | B2 | 3/2008 | Zimron et al. |

(Continued)

FOREIGN PATENT DOCUMENTS

WO    WO 98/40603    9/1998

OTHER PUBLICATIONS

Tolme, "As Geothermal Energy Heats Up, 5 Next-Gen Projects Take Shape", (Sep. 2, 2008), available at http://www.popularmechanics.com/science/earth/4279680.

(Continued)

*Primary Examiner* — Zakiya W Bates
(74) *Attorney, Agent, or Firm* — Christopher D. Northcutt; Gregory L. Porter

(57) ABSTRACT

The invention pertains to new processes and apparatuses which can effectively and efficiently convert heat contained in wellhead fluids comprising hydrocarbons to a useful energy source like electricity. The process generally comprises first producing a heat containing fluid comprising one or more hydrocarbons from a wellhead and then passing the heat containing fluid to one or more heat exchangers. The one or more exchanger exchange at least a portion of the heat contained in the heat containing fluid to a working fluid thereby producing a heated working fluid capable of converting energy.

28 Claims, 6 Drawing Sheets

U.S. PATENT DOCUMENTS

| | | | |
|---|---|---|---|
| 2005/0016729 A1* | 1/2005 | Savage | 166/302 |
| 2008/0022684 A1 | 1/2008 | Baldwin et al. | |
| 2008/0174115 A1 | 7/2008 | Lambirth | |
| 2009/0071648 A1* | 3/2009 | Hagen et al. | 166/272.1 |
| 2009/0126923 A1* | 5/2009 | Montgomery et al. | 166/57 |

OTHER PUBLICATIONS

McKenna et al., "Geothermal electric power supply possible from Gulf Coast, Midcontinent oil field waters", 103(33) Oil and Gas Journal, (Sep. 5, 2005), pp. 34-40.

Proceedings, Thirty-Second Workshop on Geothermal Reservoir Engineering, Stanford University, Stanford, California, Jan. 22-24, 2007 SGP-TR-183.

Johnson, "Unlocking the power potential of wastewater", 228 (9) World Oil vol. (Sep. 2007), available at http://www.worldoil.com/magazine.

Geothermal Power: Clean, Reliable and Renewable, (Jul. 10, 2008), www.ormat.com/businesses.php?did=29.

Subcontractor Report: National Account Energy Alliance Final Report for the Basin Electric Project . . . , Oak Ridge Nat'l Laboratory, ORNL/TM-2007/158 (Dec. 2007).

"Geothermal Energy Improves U.S. Oil Recovery", available at http://biz/yahoo.com/prnews/081019/clsu901.html.

Snow, "DOE generates electricity from producing well's hot water", Oil & Gas J. (Oct. 27, 2008).

Milliken, "Geothermal Resources at Naval Petroleum Reserve-3 (NPR-3), Wyoming", Proceedings, Thirty-Second Workshop on Geothermal Reservoir Engineering Stanford University, Stanford, California, Jan. 22-24, 2007, SGP-TR-183.

* cited by examiner

USING HEAT FROM PRODUCED FLUIDS OF OIL AND GAS OPERATIONS TO PRODUCE ENERGY

FIELD OF THE INVENTION

Provided herein are processes and apparatuses for generating useful energy from the heat contained in a stream of produced fluids from, for example, oil and/or gas operations.

BACKGROUND AND SUMMARY OF THE INVENTION

In light of energy prices and environmental concerns, alternative processes for the production of energy such as electricity and its thermal equivalent are needed. In that vein many processes have been used to convert waste heat to electricity. A process limited to geothermal fluid sources is described in, for example, U.S. Pat. No. 5,660,042 which employs using the waste heat from a naturally occurring hot water source to make electricity. Another process is described in U.S. Pat. No. 6,571,548 in which heat is extracted from the exhaust of a gas turbine unit to drive a generator that generates electricity. Yet another potential process was described in World Oil Vol. 228 No. 9 (September 2007) where an attempt was made to generate electricity from the waste water of an oil field using a unit that was "field-proven in other situations, but never used in an oil field." It was believed that this would work "Because both of these water streams [were] of high quality" with "the only contaminant [approaching] the surface discharge limit is chlorine." Therefore, it was surmised that the water "should not present a fouling problem in the geothermal unit's heat exchangers as the water temperature decreases." Similar attempts to use geothermal heat are discussed at *PROCEEDINGS*. Thirty-Second Workshop on Geothermal Reservoir Engineering, Stanford University, Stanford, Calif., Jan. 22-24, 2007 SGP-TR-183 and *Oil and Gas Journal*, McKenna et al., Sep. 5, 2005. pp. 34-40. Thus, up until the present invention problems such as fouling of process equipment prevented using heat from oil and/or gas operation for useful energy.

Thus, while many processes have been invented to generate electricity from a conventional geothermal source like hot water or steam, no process exists to extract heat directly from a produced, single or multiphase hydrocarbon, fluid and convert it to a useful energy source such as electricity. Accordingly, new processes are needed which can effectively and efficiently convert heat contained in produced fluids to a useful energy source like electricity.

The instant invention provides new processes and apparatuses for use in effectively and efficiently converting heat contained in produced fluids like oil, gas, water and mixtures thereof to a beneficial use such as producing electricity or other useful energy such as heating another stream or fluid.

In one embodiment, the instant invention relates to a process for generating a heated working fluid that may be capable of converting energy. The process comprises gathering a heat containing fluid comprising one or more hydrocarbons from an oil or gas operation wherein said heat-containing fluid comprises at least a substantially vapor phase and a substantially liquid phase. If multiphase, the substantially vapor phase is then preferably separated from said substantially liquid phase. Next, a vapor heat exchanger and a liquid heat exchanger may then be employed to exchange at least a portion of the heat contained in each of said phases to a working fluid thereby producing a heated working fluid. The heated working fluid may be capable of converting energy.

In another embodiment the invention relates to a process for generating a heated working fluid that may be capable of converting energy. The process comprises first gathering a heat containing fluid comprising one or more hydrocarbons from an oil or gas operation. Next, the heat containing fluid is passed to one or more heat exchangers to exchange at least a portion of the heat contained in said heat containing fluid to a working fluid. This produces a heated working fluid that may be capable of converting energy. Preferably, the heat containing fluid is a mixture comprising oil, water, and one or more gases. The working fluid may be water which includes, for example, untreated or treated water, softened water, as well as, deoxygenated process water and may be employed in, for example, a closed loop intermediate system.

In another embodiment, the instant invention relates to an apparatus for generating a heated working fluid that may be capable of converting energy. The apparatus comprises a wellhead that is capable of producing a heat containing fluid comprising one or more hydrocarbons wherein said heat-containing fluid comprises at least a substantially vapor phase and a substantially liquid phase. The apparatus also comprises a separator that is operably connected to the wellhead. The separator is capable of separating said substantially vapor phase from said substantially liquid phase. A vapor heat exchanger is operably connected to the separator to accept the substantially vapor phase from the separator and exchange at least a portion of the heat contained in said substantially vapor phase to a working fluid thereby producing a heated working fluid capable of converting energy. A liquid heat exchanger is operably connected to the separator to accept the substantially liquid phase from the separator and exchange at least a portion of the heat contained in said substantially liquid phase to a working fluid thereby producing a heated working fluid capable of converting energy. The apparatus also typically comprises one or more pipes, e.g. one or more conductors, operably connected to the vapor heat exchanger, the liquid heat exchanger, or both to transfer the heated working fluid to, for example, a power plant to generate electricity from said heated working fluid or as thermal energy to, for example, heat another stream in need of heating.

DETAILED DESCRIPTION OF THE INVENTION

Figure 1:
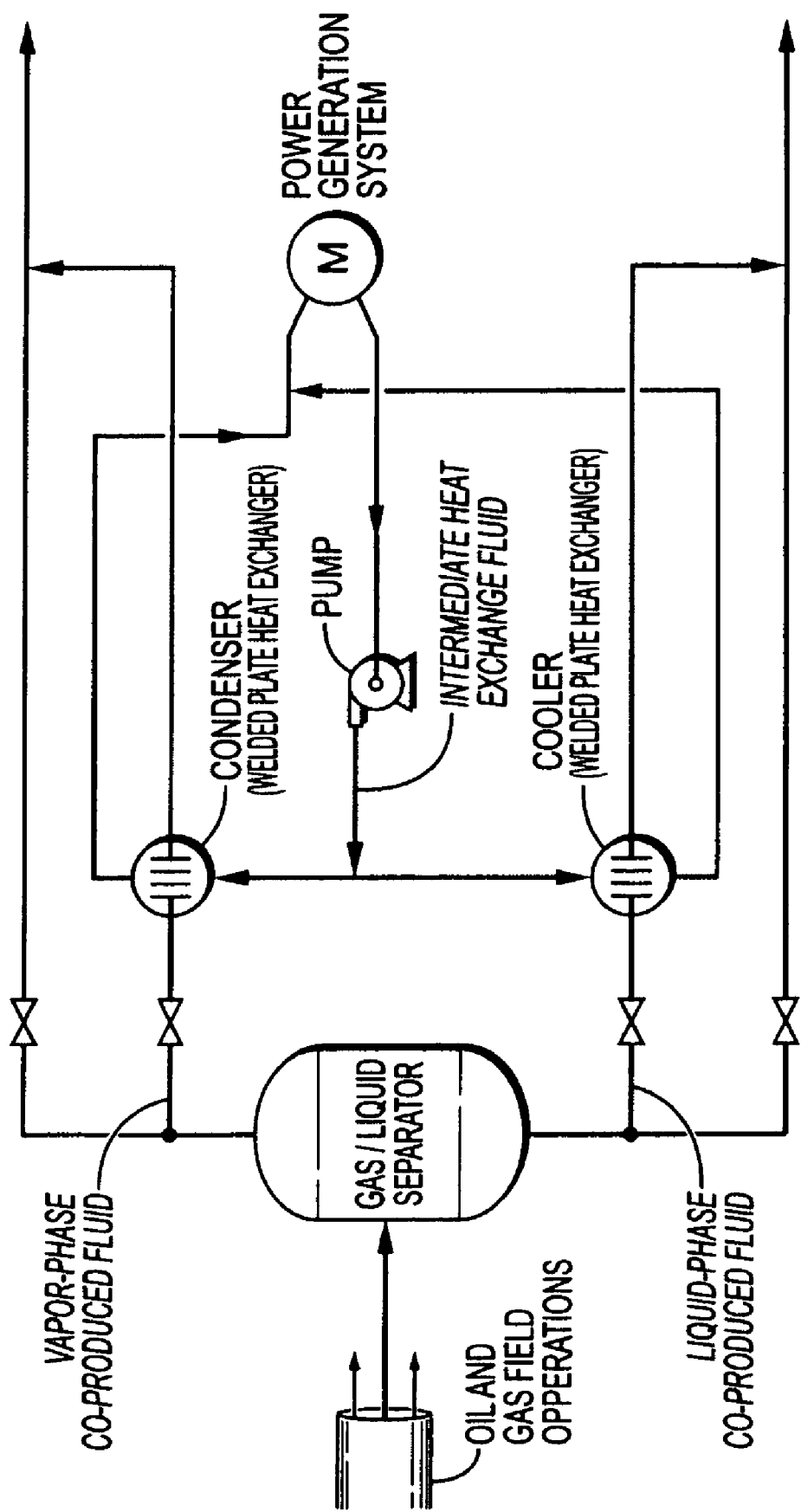
FIG. 1 is a schematic of one embodiment of the invention employing two welded plate heat exchangers for power generation.
Figure 2:
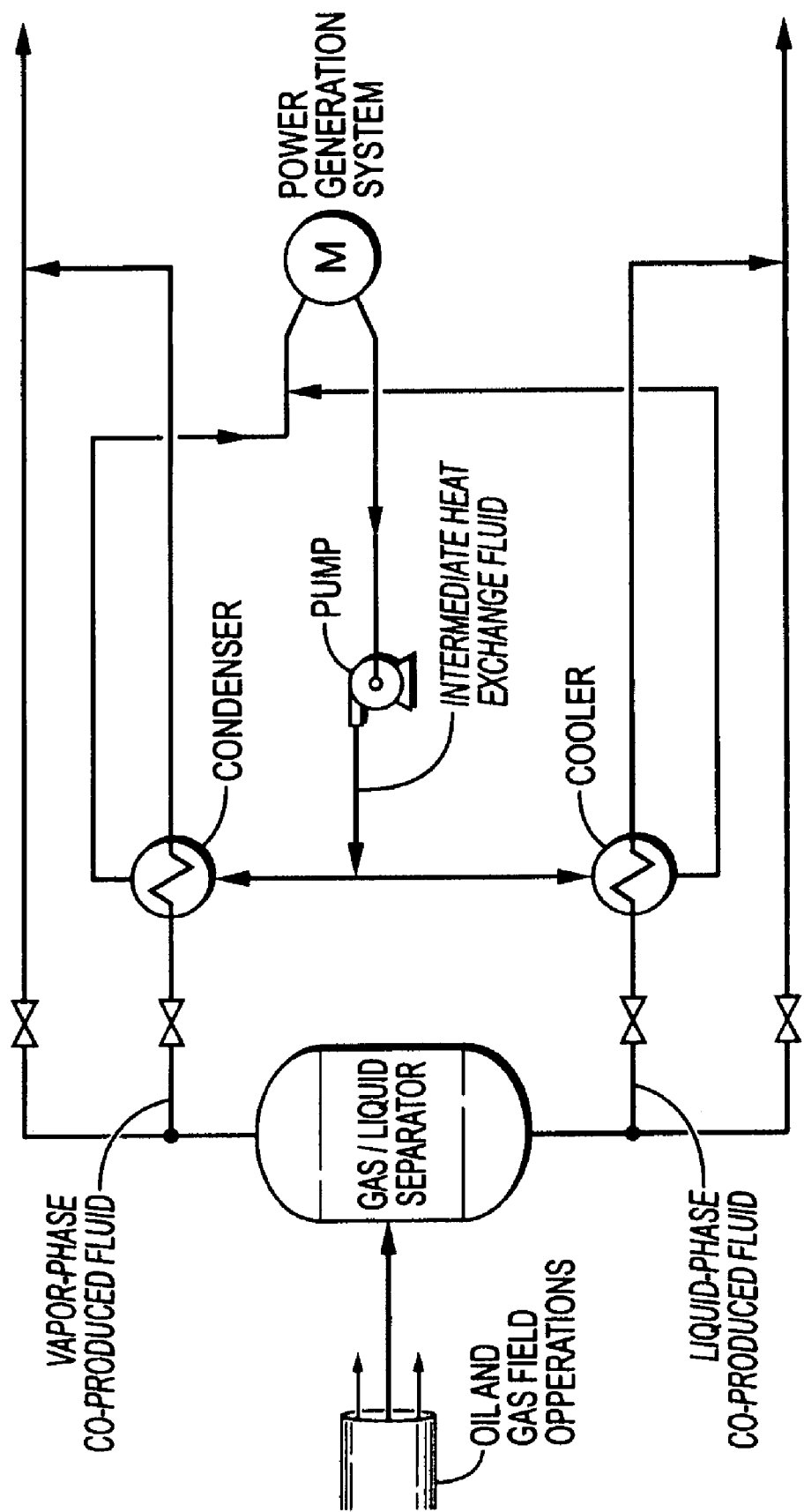
FIG. 2 is a schematic of one embodiment of the invention employing two heat exchangers for power generation.
Figure 3:
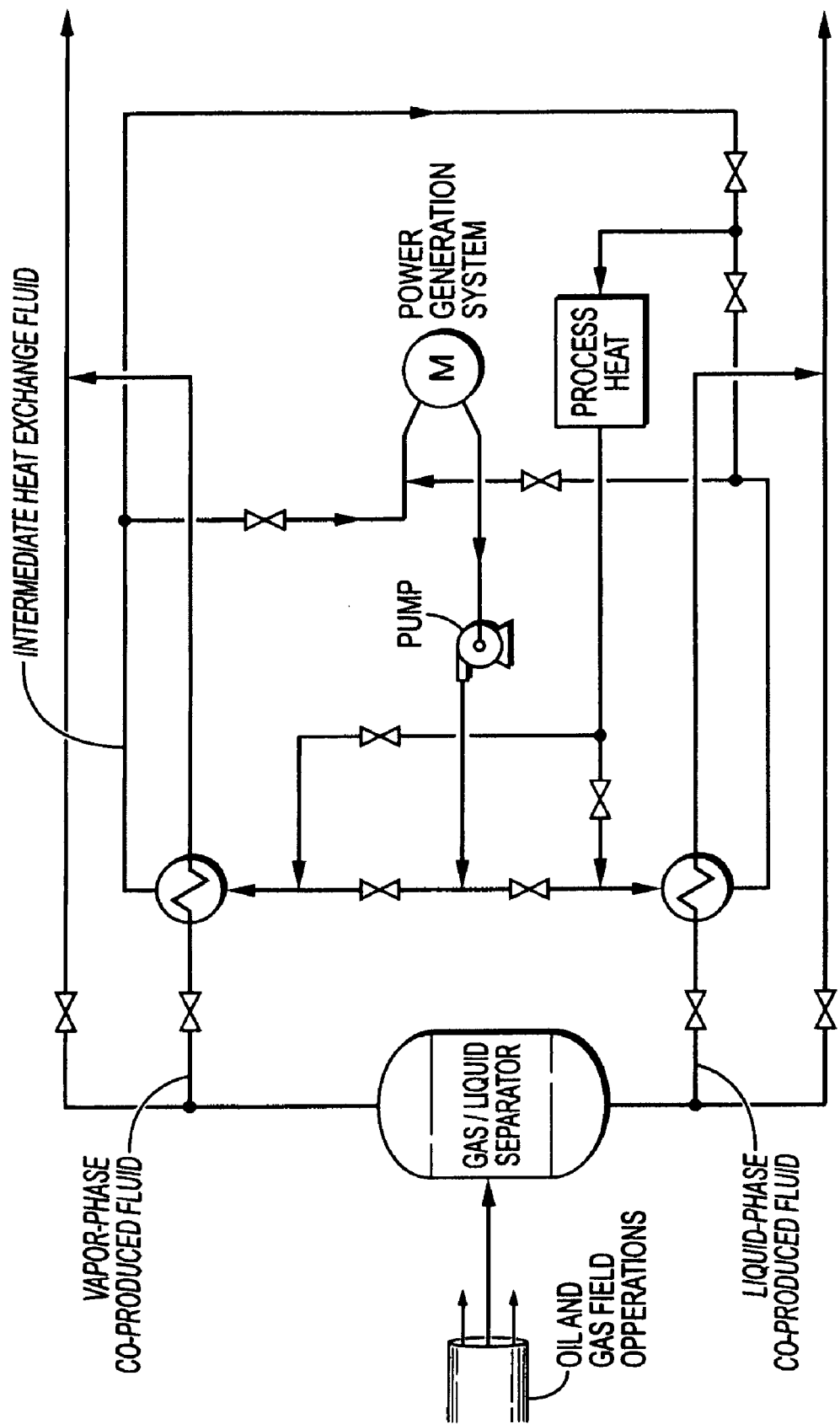
FIG. 3 is a schematic of one embodiment of the invention employing two welded plate heat exchangers for power generation and use of process heat from the cooler.
Figure 4:
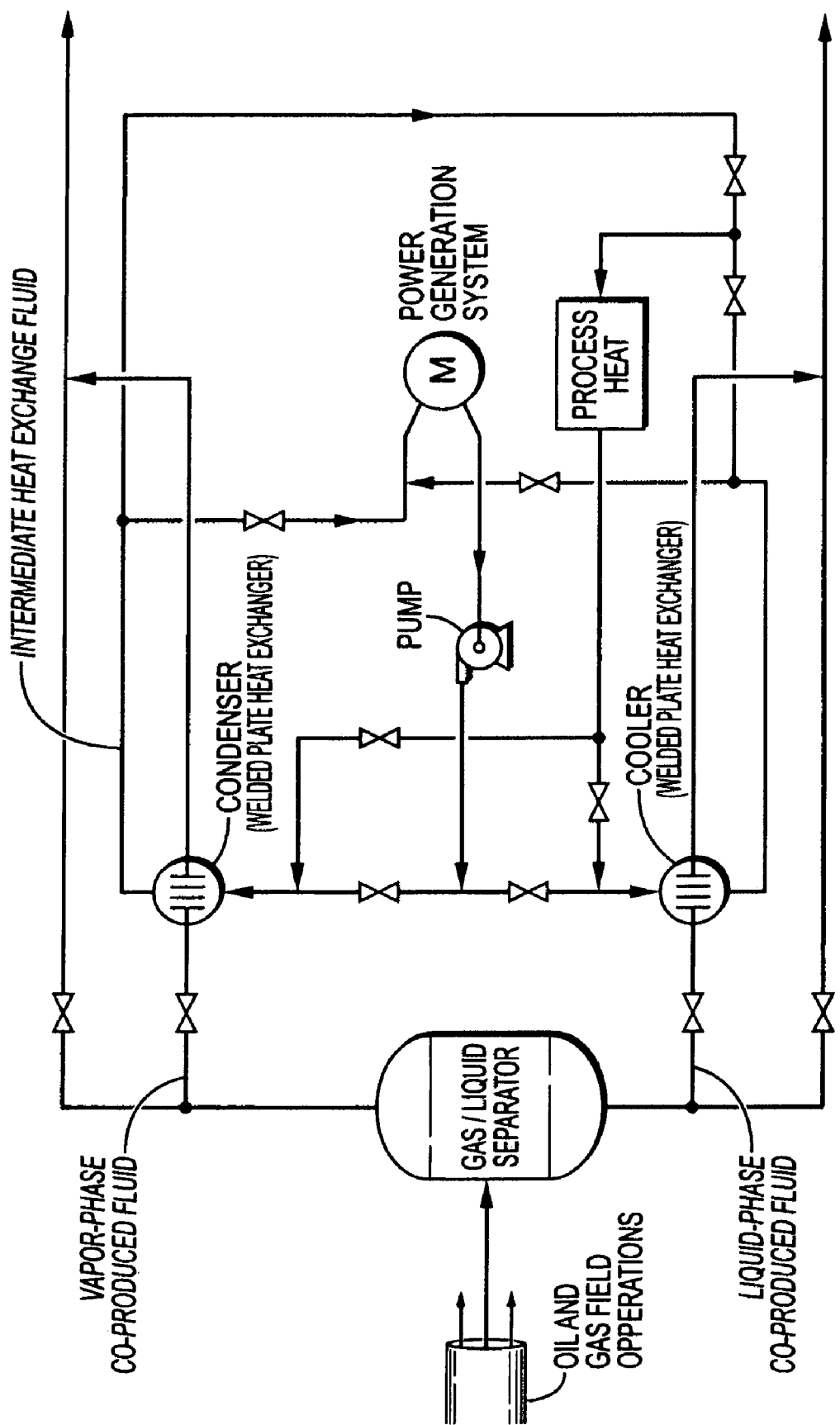
FIG. 4 is a schematic of one embodiment of the invention employing two welded plate heat exchangers for power generation and optional further heat exchange.
Figure 5:
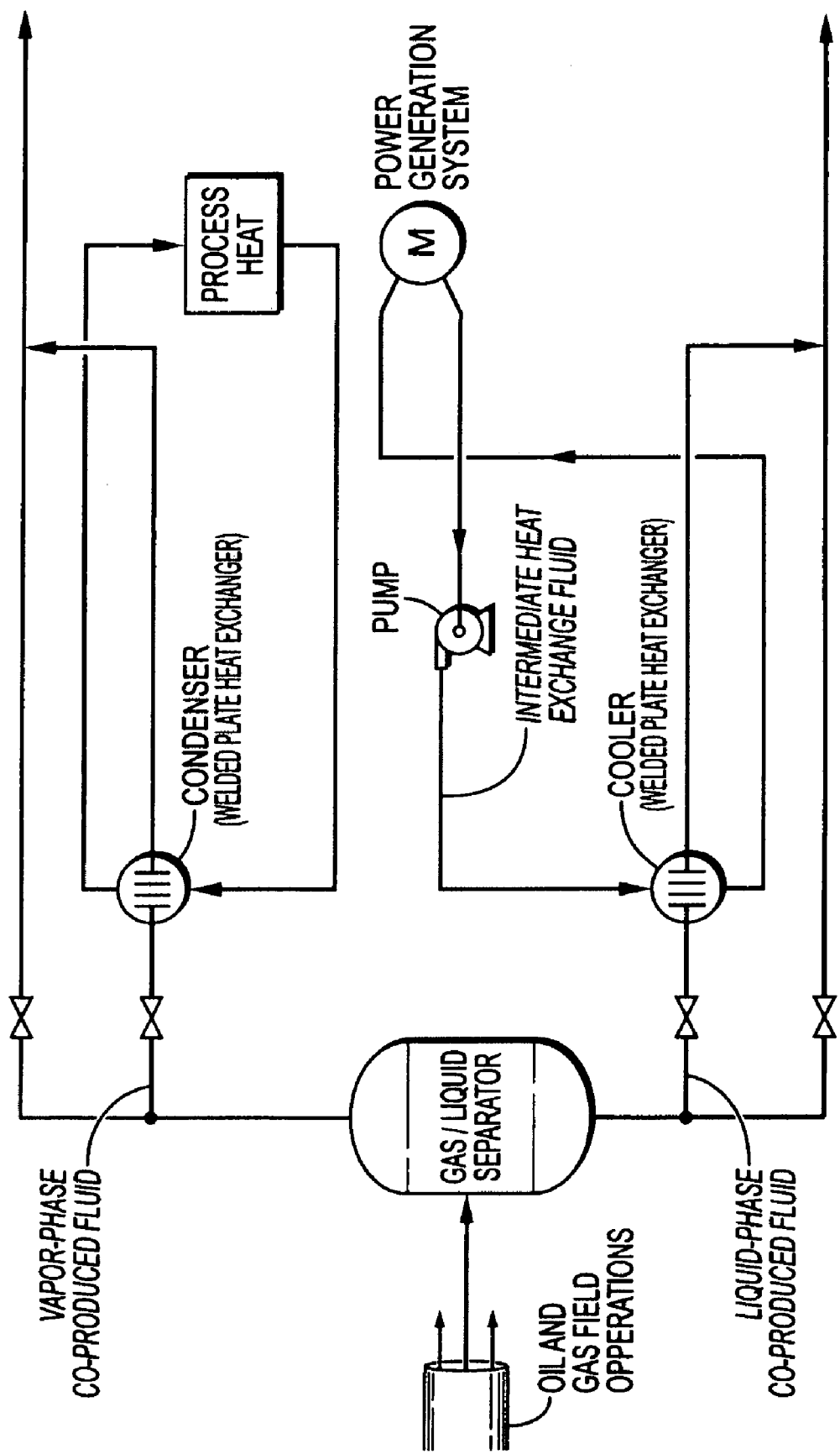
FIG. 5 is a schematic of one embodiment of the invention employing two welded plate heat exchangers for power generation and use of process heat from the condenser.
Figure 6:
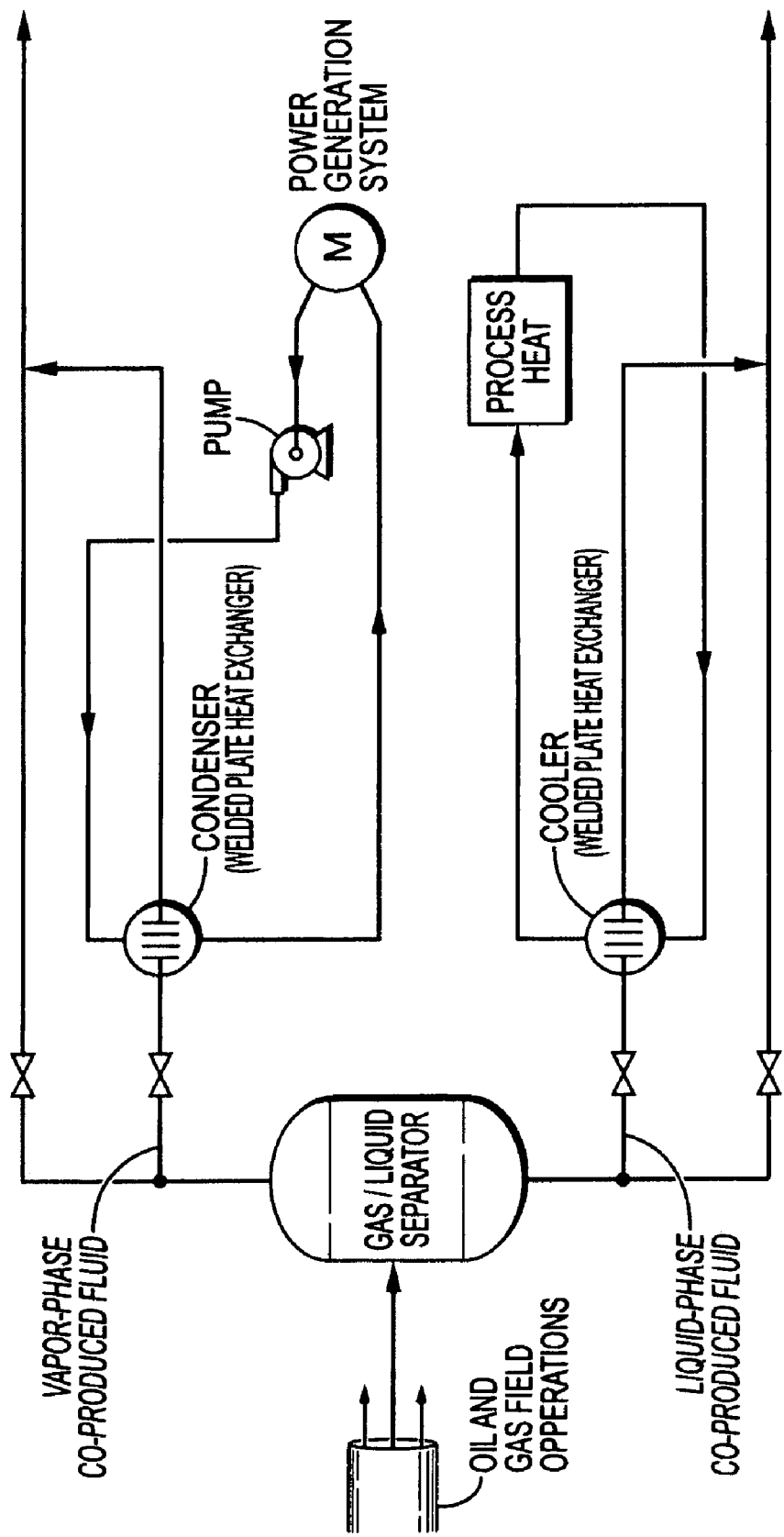
FIG. 6 is a schematic of one embodiment of the invention employing two welded plate heat exchangers for power generation and use of process heat from the cooler.

The instant process involves generating a heated working fluid from a produced fluid of an oil and gas operation. The produced fluid typically comprises at least one hydrocarbon and may be a single phase or multiple phases while the heated working fluid is often capable of converting, i.e., transferring, storing, and/or producing energy. The energy may take any convenient form depending upon the specific process employed. For example, energy of the heated working fluid may be converted into electricity or another form of power such as thermal power. Alternatively, the energy of the heated working fluid may be used in the same or another process to, for example, heat a fluid stream in need of such heating or saved or converted to some other useful form of energy.

The process typically begins by first gathering, e.g., producing, a heat containing fluid from a gathering device such as a wellhead, e.g. an oil and/or natural gas and/or other hydrocarbon wellhead. The production and gathering of oil and/or natural gas, associated water or combinations thereof may be accomplished in any convenient manner. This could include natural reservoir flow (primary recovery) or employing one or more of the following: secondary recovery, tertiary recovery, thermal recovery (e.g. steamflooding) of the hydrocarbon reservoir, and combinations thereof. Additional recovery can be performed by utilizing artificial lift methods (e.g., mechanical lift, pumping unit, plunger lift, gas lift, hydraulic lift, or similar systems). Such terms are well understood by one of skill in the oil and gas art and are described in, for example, Schlumberger Oilfield Glossary, which is incorporated herein by reference. It is understood that in geothermal processes the primary function is heat recovery wherein heat is extracted from the earth for conversion to energy while oil and gas field operations primary purpose is the production of oil and/or gas and recovery of hydrocarbons.

Additionally, the aforementioned oil and gas operations artificial lift techniques are used in a different manner than in geothermal processes. As mentioned in the "Enhanced Geothermal Workshop pg 9" (San Francisco, 2007) (the entirety of which is incorporated herein by reference) artificial lift techniques like that for oil and gas wells is often not required in geothermal applications. This is because the geothermal well may be expected to self-flow at some rate, but submersible pumps of either the line-shaft variety (powered from the surface) or electrical submersible pumps (ESPs) will be used to assist flow and provide control. Additionally, in contrast to heat recovery in geothermal processes wherein any steam and/or brine fluid is used exclusively or primarily as a heat carrier to extract heat from the earth to convert to energy, in the instant invention any waterflood fluid under traditional secondary recovery or steamflood fluid or chemical flood fluid under traditional tertiary or thermal recovery has a primary purpose of maintaining or increasing oil and/or gas production and recovery of hydrocarbons by sweeping same from the reservoir, as well as, serving as a heat carrier.

The term wellhead is intended to comprise one or more valve and/or casing assemblies or systems at the surface of a well or a reservoir, irrespective of whether well or reservoir is located on land or water. The term wellhead may include a single wellhead or a group and is usually encompassed within the meaning of the broader term "gathering system". In other words, the heat containing fluid is intrinsically primarily derived from oil and gas field operations wherein oil and gas field operations means primary field operations associated with the exploration, development, or production of, for example, hydrocarbons like crude oil and/or natural gas, inert gases, as well as, associated byproduct fluids like water. This, of course, includes the case in which an aquifer is discovered while exploring for hydrocarbons in which case a heat containing fluid may be extracted and exchanged to produce energy. As further explanation the heat containing fluid is typically not derived from an operation which is primarily a transportation operation or a manufacturing operation such as a steam turbine system.

The design of the gathering system, e.g., wellhead, from which the heat containing fluid may be obtained is not particularly critical so long as it is capable of removing and delivering a sufficiently heated fluid. The heated fluid may comprise any fluid capable of carrying and transferring heat. The heat may be naturally occurring or unnatural such as the heat resulting from, for example, injecting steam into a well. In one embodiment the heated fluid is not separated or is incapable of being separated and energy is produced or obtained directly from the heated fluid. In one embodiment the heated fluid is preferably capable of generating at least a substantially vapor phase and a substantially liquid phase after separation wherein either one or both phases are capable of carrying and transferring heat. As used herein, a "substantially vapor phase" means a component or mixture of components that is at least about 80, preferably at least 90, more preferably at least about 95% by volume vapor. On the other hand, "substantially liquid phase" means a component or mixture of components that is at least about 80, preferably at least 90, more preferably at least 95% by volume in a liquid.

The heat containing fluid typically comprise one or more hydrocarbons. Such hydrocarbons include, but are not limited to, those selected from the group consisting of lower molecular weight hydrocarbons like alkanes having from about one to about six carbon atoms, as well as, higher molecular weight hydrocarbons such as oil and mixtures thereof. A substantially vapor phase, if present, of the heat containing fluid preferably comprises gas, e.g. methane, steam, or a mixture thereof. The substantially liquid phase, if present, of the heat containing fluid preferably comprises oil, water, or a mixture comprising oil and water. The relative amounts of substantially vapor phase and substantially liquid phase present in the heat containing fluid may vary widely depending upon the nature of the produced fluids from the wellhead. However preferably the heat containing fluid may comprise at least about 5, more preferably at least about 10 weight percent of a substantially vapor phase. On the other hand, the heat containing fluid may comprise up to about 70, more preferably up to about 30 weight percent of a substantially vapor phase. The heat containing fluid may further comprise solids. Such solids may include, for example, small amounts, e.g., less than about 3% by weight of sand, clays, other materials and mixtures that are produced.

When a substantially vapor phase of the heat containing fluid comprises a gas, steam, or both, the gas and/or steam may be present in any amount and have any characteristic so long as the process is not significantly hindered and the apparatus is capable of handling it. In some embodiments, the amount of gas in the substantially vapor phase may be from at least about 5, preferably at least about 10, up to about 30 or more, preferably up to about 15 mole percent gas based on total volume of substantially vapor phase. Often, the substantially vapor phase comprises at least about 10, preferably at least about 30 mole percent non-condensable gases such as methane and may also comprise other non-condensable gases such as hydrogen, oxygen, nitrogen, argon, helium, ethane, ammonia, benzene, carbon dioxide, or mixtures or compounds thereof. In various embodiments, the gas of the substantially vapor phase of the heat containing fluid may be characterized by one or more of the following characteristics: (1) an average heat capacity of from about 0.12 to about 0.59 Btu/lbm-° F.; or (2) a thermal conductivity of from about 0.0069 to about 0.098 Btu/hr-ft-° F.; or (3) an average quantity of magnesium of greater than about 10 ppm; or (4) an average quantity of non-condensable gases of greater than about 1% by weight; or (5) greater than about 90%, preferably greater than about 95%, of the total weight of quantity of non-condensable gas comprises carbon dioxide.

When the substantially liquid phase of the heat containing fluid comprises oil, or a mixture of oil and water the oil and water may be present in any amount and have any characteristic so long as the process is not significantly hindered and the apparatus is capable of handling it. Useful amounts of oil in the substantially liquid phase may comprise at least about 1, preferably at least about 20 weight percent or more, up to about 100 weight percent of oil. In various embodiments, the oil may be characterized by, for example, (typical 12 degree API pseudo composition) one or more of the following characteristics: (1) a viscosity of from about 1 to about 1,000 cp; (2) an average gravity of at least about 5 API up to about 70 API, preferably up to about 20 API; or (3) an average heat capacity of from about 0.43 to about 1.61 Btu/lbm-° F.; or (4) a thermal conductivity of from about 0.06 to about 0.36 Btu/hr-ft-° F.

The heat containing fluid may be any temperature so long as there is enough heat present to be transferred to a working fluid and not so much heat that the apparatus is incapable of handling the heat containing fluid. Typically, the temperature of the heat containing fluid varies widely depending upon the particular well and the constituents of the heat containing produced fluid. Typical heat containing fluids that may be useful in the instant invention may have a temperature at or near the outlet of the wellhead of at least about 150° F., preferably at least about 200° F., more preferably at least about 280° F. On the other hand, typical heat containing fluids that may be useful in the instant invention may have a temperature at or near the outlet of the wellhead up to about 800° F. preferably up to about 500° F., more preferably up to about 600° F. If the heat containing fluid exceeds the temperature that the apparatus is capable of handling, then the heat containing fluid may be quenched to the desired temperature.

If a substantially vapor phase is to be separated from a substantially liquid phase, then the separation may be accomplished in any convenient manner using any apparatus known in the art or hereinafter available. For example, separation may be accomplished using gravity so the vapor exits above and the liquid exits below. Specifically, a gas-liquid cylindrical vessel or gas-liquid centrifugal separator may be employed. Useful cylindrical vessels are commonly called knock-out pots, vapor-liquid separators, or flash drums and often employ a sloped tangential inlet nozzle, sized to deliver a preconditioned flow stream into the body of the separator. The momentum of the heat containing fluid combined with the tangential inlet generates a liquid vortex with sufficient G-forces for bulk vapor and liquid separation to rapidly occur. The gas typically exits through the top of the vessel while the liquid typically exits though the bottom of the vessel.

The separation is preferably conducted in an efficient manner. That is, the separation is such that any vapor carryunder into the liquid and/or any liquid carryover into the vapor is minimized. In various embodiments, the vapor carryunder into the liquid may be less than 5% by weight. Correspondingly, in various liquid carryover into the vapor may be less than 5% by weight. It may also be preferable that heat is not lost to the environment or otherwise during the separation process in order to maximize the efficiency of the overall process. Thus, in various embodiments the heat contained in the substantially vapor phase after separation is from about 70 to about 100 percent of the heat contained in the heat containing fluid before separation while the heat contained in the substantially liquid phase after separation is at least about 30, preferably at least about 70 up to about 90, more preferably up to about 100 percent of the heat contained in the heat containing fluid before separation.

In some oil wells, casinghead gas is produced along with oil and may accumulate in any annular space present, e.g., between any tubing and casing. In such situations, it may be efficient to design the apparatus such that such gas may be taken off at the top of the well, at the separator, or both.

Heat exchangers are commonly employed to exchange at least a portion of the heat contained in the produced fluid to a working fluid. For example, a vapor heat exchanger and/or a liquid heat exchanger may be employed to exchange at least a portion of the heat contained in each of said phases to a working fluid. In this manner, a heated working fluid capable of converting energy, e.g., electricity, is made. Typically, from about 50 to about 80 percent of the total heat containing fluid may be fed into the vapor heat exchanger. The working fluid may be any convenient fluid such as heat transfer fluid, e.g., Texatherm™, Therminol™ (a C14-30 alkylaromatic derivatives), oil, refrigerant, hydrocarbon, water, or any mixture thereof. For ease and availability untreated water is often preferred while softened or deoxygenated process water in a closed loop intermediate system is more preferred.

The heat exchangers may be made of any convenient metal and any convenient design so long as they do not facilitate excess fouling and exchange heat. It has been found that welded plates made of for example, ceramic, stainless steels such as stainless steel 316, nickel alloys, copper-nickel alloys, aluminum, carbon steel, titanium, or various other corrosion-resistant alloys may be employed. In this manner, the vapor heat exchanger cools the substantially vapor phase. In some embodiments the vapor heat exchanger cools the substantially vapor phase such that upon exiting the vapor heat exchanger the stream may have from about 10 to about 90 percent of the heat it had upon entering the vapor heat exchanger. Similarly, the liquid heat exchanger cools the substantially liquid phase. In some embodiments the liquid heat exchanger cools the substantially liquid phase such that upon exiting the liquid heat exchanger the stream may have from about 10 to about 90 percent of the heat it had upon entering the liquid heat exchanger. Advantageously, in some embodiments the vapor heat exchanger and liquid heat exchanger may be operated independently of one another. This facilitates operation so that one or other exchanger may be cleaned or serviced while the other continues operating.

While the invention is capable of being implemented in a variety of ways and specific apparatuses, FIGS. 1-6 schematically illustrate a few specific embodiments of the invention.

In FIGS. 1-6, a gathering device such as a wellhead is typically located at or near 1 (oil and gas field operations). A heat containing fluid comprising one or more hydrocarbons is produced, i.e., extracted, from the wellhead where it is passed to 2 (separator) where the heat-containing fluid is separated into a substantially vapor phase and substantially liquid phase. The separator 2 is often a vessel wherein the liquid is separated by gravity and therefore falls to the bottom of the vessel where it is withdrawn. The vapor travels upward at a velocity typically designed to minimize entrainment of any liquid droplets in the vapor. The vapor exits the top of the vessel. Alternatively, the separator 2 may be a vessel capable of removing immiscible fluids having different specific gravities by accelerating the fluid mechanically in a circular path and using the radial acceleration component to isolate these contaminants, e.g. centrifugal separator.

After separation, the vapor phase 8 may be transferred to condenser 3 while the liquid phase 9 may be transferred to Cooler 4. Condensor 3 is a vapor heat exchanger and is typically a heat exchange device or unit used to condense a vapor into liquid by absorbing the vapors' latent heat (and potentially a portion of any sensible heat particularly for, for example, heavier components) into cooling fluid (i.e. water, refrigerant, or other cooling fluid). Cooler 4 is a liquid heat exchanger and is typically heat exchange device or unit used to transfer sensible heat from a fluid (plus any latent heat from any carryover vapors) flowing on one side of a barrier to another cooler fluid flowing on the other side of the barrier. In this manner at least a portion of the heat contained in one or both phases (depending upon the specific embodiment) is exchanged to a working fluid shown as intermediate heat exchange fluid 7. In one embodiment, the heat exchangers may be configured to be controlled and/or operated separately. If desired, this allows one to bypass either heat exchanger while still extracting heat to produce power or thermal energy. This facilitates, for example, cleaning one heat exchanger while the other is operating.

The working fluid may be transferred to the power generation system 6 in order to produce energy. The power generation 6 may be any Organic Rankine cycle, Kalina cycle, Carnot cycle or other power generation system. Alternatively or in addition to power generation, depending upon the specific embodiment, heat may be removed at various points in the process as process heat 10 for use in heating another stream if desired. The pump 5 is simply used to move the fluids from lower pressure to higher pressure by adding energy (compression force) to the system.

Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

EXAMPLES

A heat containing fluid comprising one or more hydrocarbons is produced from a wellhead in oil and gas operations. The fluid is separated into a vapor phase and a liquid phase using a separator. The liquid contains oil, hydrocarbons, water while the vapor phase contains gas, other noncondensables, and steam. Representative fluid properties are described in Tables 1-4 below.

The process begins with the production of a heat-containing fluid originating from an oil and/or gas field (shown as 1 in FIG. 1). The heat-containing fluid is comprised in part of liquid and in part of vapor. The heat supply stream production rate is approximately from about 12,000 to about 15,000 barrels per day of fluid and from about 18 to about 22 million standard cubic feet per day of vapor. Thus, the vapor content of the heat containing fluid equates to a range from about 10 to about 30 weight percent. The temperature range of the heat containing fluid is from about 280° F. to about 350° F. with a pressure range from about 80 psig to about 100 psig.

The fluid passes through a gas/liquid separator (shown as 2 in FIG. 1) to split the gas and liquid streams. This increases the efficiency of capturing any retained heat energy in both the liquid and the gas stream. The liquid contains oil, water, and other hydrocarbons while the vapor contains gas, steam, and other noncondensables. After separation, the vapor is transferred to a welded plate heat exchanger (shown as 3 in FIG. 1) where it is condensed. The liquid is transferred to a separate welded plate heat exchanger (shown as 4 in FIG. 1) where it is cooled. The temperature change of the vapor and liquid phases are approximately from about 80° F. to about 150° F. In this step, a portion of the heat in the liquid and/or vapor is exchanged to a working fluid, in this case, deoxygenated water.

The heat of the deoxygenated water is converted to power in a power generation system mechanism (shown as 6 in FIG. 1), namely a turbine that employs an Organic Rankine cycle, to produce energy. This results in a net power output of approximately from about 1.8 to about 2.5 MW. The temperature and pressure ranges of the entire system are approximately from about 170° F. to about 340° F. and from about 70 psig to about 130 psig, respectively. The deoxygenated water is then recirculated through a pump (shown as 7 in FIG. 7) which is capable of increasing the water pressure by from about 15 psig to about 25 psig.

TABLE 1

Fluid Properties

|  |  |  | High | Low |
|---|---|---|---|---|
| Liquid Flow Rates | Total | BPD | 17,034 | 11,895 |
|  | Oil | BOPD | 4,599 | 4,163 |
|  | Water | BWPD | 12,435 | 7,732 |
|  | Water Cut | vol % | 73 | 65 |
|  | Oil Cut | vol % | 27 | 35 |
| Vapor Flow Rates | Total | MSCFD | 19,818 | 17,940 |
|  | Gas | MSCFD | 1,150 | 1,041 |
|  | Steam | BSPD | 2,530 | 2,290 |

|  |  |  | Inlet | | Outlet | |
|---|---|---|---|---|---|---|
| Operating Conditions |  |  | Max | Min | Liquid | Vapor |
| Temperature | T | deg F. | 350 | 270 | 200 | 190 |
| Pressure | P | psig | 110 | 75 | 85 | 85 |
| Water Properties |  |  |  |  |  |  |
| Viscosity | ° | cp | 0.15 | 0.21 | 0.31 |  |
| Density | ° | lb/ft³ | 54.81 | 57.43 | 59.67 |  |
| Molecular Weight | MW | lb/lbmole | 18.02 | 18.02 | 18.02 |  |
| Heat Capacity | Cp | BTU/(lb*F.) | 1.13 | 1.07 | 1.05 |  |
| Thermal Conductivity | k | BTU/(hr * ft * F.) | 0.39 | 0.40 | 0.39 |  |

TABLE 1-continued

Fluid Properties

Oil Properties (Typical 12 deg API Pseudo-

| | | | | | |
|---|---|---|---|---|---|
| Viscosity | ° | cp | 9.46 | 22.64 | 81.99 |
| Density | ° | lb/ft³ | 53.44 | 55.59 | 57.56 |
| Molecular Weight | MW | lb/lbmole | 250.00 | 250.00 | 250.00 |
| Heat Capacity | Cp | BTU/(lb * F.) | 0.51 | 0.48 | 0.44 |
| Thermal Conductivity | k | BTU/(hr * ft * F.) | 0.08 | 0.09 | 0.09 |

Gas Properties

| | | | | | |
|---|---|---|---|---|---|
| Viscosity | ° | cp | 0.02 | 0.02 | 0.02 |
| Density | ° | lb/ft³ | 0.51 | 0.18 | 0.31 |
| Molecular Weight | MW | lb/lbmole | 33.11 | 33.11 | 33.11 |
| Heat Capacity | Cp | BTU/(lb * F.) | 0.32 | 0.31 | 0.30 |
| Thermal Conductivity | k | BTU/(hr * ft * F.) | 0.02 | 0.02 | 0.02 |

Steam Properties

| | | | | | |
|---|---|---|---|---|---|
| Enthalpy of Vaporization | $H_{vap}$ | BTU/lb | 871 | 931 | 887 |
| Viscosity | ° | cp | 0.01 | 0.01 | 0.0145 |
| Density | ° | lb/ft³ | 0.29 | 0.10 | 0.2278 |
| Molecular Weight | MW | lb/lbmole | 18.02 | 18.02 | 18.0152 |
| Heat Capacity | Cp | BTU/(lb * F.) | 0.49 | 0.46 | 0.4788 |
| Thermal Conductivity | k | BTU/(hr * ft * F.) | 0.02 | 0.02 | 0.0173 |

TABLE 2

Water Analysis

| | | | ppm (mg/l) |
|---|---|---|---|
| | CATIONS BY ICP | | |
| 1 | Sodium | $Na^+$ | 2250 |
| 2 | Potassium | $K^+$ | 138 |
| 3 | Magnesium | $Mg^{+2}$ | 1.42 |
| 4 | Calcium | $Ca^{+2}$ | 18.9 |
| 5 | Iron | $Fe^{+2}$ | 0.57 |
| 6 | Copper | $Cu^{+2}$ | 0 |
| 7 | Zinc | $Zn^{+2}$ | 0.01 |
| 8 | Aluminum | $Al^{+3}$ | 0.09 |
| 9 | Barium | $Ba^{+2}$ | 0.46 |
| 10 | Cadmium | $Cd^{2+}$ | 0 |
| 11 | Chromium | $Cr^{+3}$ | 0 |
| 12 | Lead | $Pb^{2+}$ | 0.01 |
| 13 | Manganese | $Mn^{+2}$ | 0 |
| 14 | Nickel | $Ni^{+2}$ | 0 |
| 15 | Strontium | $Sr^{+2}$ | 0.45 |
| 16 | Silicon | $Si^{+4}$ | 373 |
| 17 | Tin | $Sn^{+2}$ | 0 |
| | ORGANIC ACIDS, ALKALINITY AND ANIONS | | |
| | ORGANIC ACIDS | | |
| 1 | Formate | $HCOO^-$ | 5 |
| 2 | Acetate | $CH_3COO^-$ | 370 |
| 3 | Propionate | $CH_3CH_2CO_2^-$ | 130 |
| 4 | Butyrate | $CH_3(CH_2)_2CO_2^-$ | 13 |
| 5 | Valerate | $CH_3(CH_2)_3CO_2^-$ | 10 |
| | BY | | |
| 6 | Bicarbonate | $HCO_3^-$ | 981.6 |
| 7 | Carbonate | $CO_3^=$ | 200.3 |
| 8 | Hydroxide | $OH^-$ | 0 |
| | ANIONS | | |
| 9 | Borate, from IC | $B(OH)_4^-$ | 833 |
| 10 | Fluoride | $F^-$ | 0 |
| 11 | Chloride | $Cl^-$ | 3000 |
| 12 | Bromide | $Br^-$ | 27 |
| 13 | Nitrite | $NO_2^-$ | 0 |
| 14 | Nitrate | $NO_3^-$ | 0 |
| 15 | Phosphate | $PO_4^{-3}$ | 0 |
| 16 | Sulfate | $SO_4^=$ | 77 |

TABLE 3

Gas composition

| Constituent | Wt % |
|---|---|
| Oxygen | 1.520 |
| Nitrogen | 6.153 |
| Carbon Dioxide | 68.751 |
| Methane | 16.090 |
| Ethane | 1.163 |
| Propane | 1.013 |
| Iso-Butane | 0.291 |
| N-Butane | 0.596 |
| Iso-Pentane | 0.424 |
| N-Pentane | 0.364 |
| Hexanes Plus | 1.654 |
| Hydrogen Sulfide | 1.981 |
| Total | 100.000 |

TABLE 4

Oil Properties 12 Deg API Oil

Oil: 12.0 deg API

| Temp | | sg | density | viscosity (kinematic) | viscosity (kin) | viscosity (dynamic) |
|---|---|---|---|---|---|---|
| ° F. | Rankine | ratio | lb/ft³ | ° (cS) | SSU | ° (cP) |
| 80 | 540 | 0.979 | 61.06 | 11000 | 50883 | 10759 |
| 90 | 550 | 0.976 | 60.87 | 7000 | 32380 | 6826 |
| 100 | 560 | 0.973 | 60.69 | 3600 | 16653 | 3500 |
| 110 | 570 | 0.969 | 60.44 | 2100 | 9714 | 2033 |
| 120 | 580 | 0.966 | 60.25 | 1300 | 6013 | 1255 |
| 130 | 590 | 0.963 | 60.06 | 900 | 4163 | 866 |
| 140 | 600 | 0.960 | 59.88 | 600 | 2775 | 575 |
| 150 | 610 | 0.957 | 59.69 | 400 | 1850 | 382 |
| 160 | 620 | 0.954 | 59.50 | 310 | 1434 | 295 |
| 170 | 630 | 0.950 | 59.25 | 230 | 1064 | 218 |
| 180 | 640 | 0.947 | 59.06 | 170 | 786 | 161 |
| 190 | 650 | 0.944 | 58.88 | 120 | 555 | 113 |
| 200 | 660 | 0.941 | 58.69 | 90 | 416 | 85 |
| 210 | 670 | 0.938 | 58.50 | 75 | 347 | 70 |
| 220 | 680 | 0.934 | 58.25 | 66 | 305 | 62 |
| 230 | 690 | 0.931 | 58.07 | 50 | 231 | 47 |
| 240 | 700 | 0.928 | 57.88 | 40 | 185 | 37 |

TABLE 4-continued

Oil Properties 12 Deg API Oil

Oil: 12.0 deg API

| Temp | | sg | density | viscosity (kinematic) | viscosity (kin) | viscosity (dynamic) |
|---|---|---|---|---|---|---|
| ° F. | Rankine | ratio | lb/ft³ | ° (cS) | SSU | ° (cP) |
| 250 | 710 | 0.925 | 57.69 | 35 | 162 | 32 |
| 260 | 720 | 0.922 | 57.51 | 29 | 134 | 27 |
| 270 | 730 | 0.919 | 57.32 | 25 | 116 | 23 |
| 280 | 740 | 0.915 | 57.07 | 20 | 93 | 18 |
| 290 | 750 | 0.912 | 56.88 | 18 | 83 | 16 |
| 300 | 760 | 0.909 | 56.69 | 16 | 74 | 15 |

What is claimed is:

1. A process for generating a heated working fluid that is capable of converting energy comprising:
 a) gathering a heat containing fluid comprising at least one or more hydrocarbons from an
oil or gas operation wherein said heat-containing fluid comprises at least a substantially vapor phase and a substantially liquid phase;
 b) separating said substantially vapor phase from said substantially liquid phase;
 c) employing a vapor heat exchanger and a liquid heat exchanger to exchange at least a portion of the heat contained in each of said phases to a working fluid thereby producing a heated working fluid.

2. The process of claim 1 wherein the gathering of the heat containing fluid is from a wellhead.

3. The process of claim 1 wherein the gathering of the heat containing fluid comprises employing artificial recovery, primary recovery, secondary recovery, tertiary recovery, and combinations thereof.

4. The process of claim 1 wherein the gathering of the heat containing fluid comprises employing artificial lift techniques.

5. The process of claim 1 wherein the heated working fluid is employed to heat another fluid stream.

6. The process of claim 1 wherein the heated working fluid is employed to produce energy.

7. The process of claim 1 wherein the heated working fluid is employed to produce electricity.

8. The process of claim 1 wherein the substantially vapor phase comprises gas and steam.

9. The process of claim 1 wherein the substantially liquid phase comprises a hydrocarbon or a mixture comprising a hydrocarbon and water.

10. The process of claim 1 wherein the substantially liquid phase comprises oil.

11. The process of claim 8 wherein the gas of the substantially vapor phase is characterized by one or more of the following characteristics: (1) an average heat capacity of from about 0.12 to about 0.59 Btu/lbm-° F.; or (2) a thermal conductivity of from about 0.0069 to about 0.098 Btu/hr-ft-° F.; or (3) an average quantity of magnesium of greater than about 10 ppm; or (4) an average quantity of non-condensable gases of greater than about 1% by weight; or (5) greater than about 90% of the total weight of quantity of non-condensable gas comprises carbon dioxide.

12. The process of claim 1 wherein the substantially liquid phase comprises a mixture of oil and water characterized by one or more of the following characteristics: (1) a viscosity of from about 1 to about 1,000 cp; or (2) an average gravity of at least about 5 API up to about 70 API; or (3) an average heat capacity of from about 0.43 to about 1.61 Btu/lbm-° F.; or (4) a thermal conductivity of from about 0.06 to about 0.36 Btu/hr-ft-° F.

13. The process of claim 1 wherein the substantially liquid phase comprises at least about 1 weight percent of oil.

14. The process of claim 1 wherein the heat containing fluid has a temperature of from about 150 to about 800 F before separating said substantially vapor phase from said substantially liquid phase.

15. The process of claim 1 wherein the vapor heat exchanger comprises welded plates.

16. The process of claim 1 wherein the liquid heat exchanger comprises welded plates.

17. The process of claim 1 wherein the liquid heat exchanger and the vapor heat exchanger comprise welded plates.

18. The process of claim 1 which further comprises cleaning one of said vapor heat exchanger and liquid heat exchanger while operating the other of said vapor heat exchanger and liquid heat exchanger.

19. The process of claim 1 wherein the working fluid is water.

20. The process of claim 1 which further comprises employing water as the working fluid in a closed loop intermediate system.

21. The process of claim 1 which further comprises employing softened water or deoxygenated water as the working fluid wherein the working fluid is employed in a closed loop intermediate system.

22. An apparatus for generating a heated working fluid that is capable of converting energy comprising:
 a) a gathering device capable of producing a heat containing fluid comprising one or more hydrocarbons wherein said heat-containing fluid comprises at least a substantially vapor phase and a substantially liquid phase;
 b) a separator operably connected to gathering device wherein said separator is capable of separating said substantially vapor phase from said substantially liquid phase;
 c) a vapor heat exchanger operably connected to the separator to accept the substantially vapor phase from the separator and exchange at least a portion of the heat contained in said substantially vapor phase to a working fluid thereby producing a heated working fluid capable of converting energy;
 d) a liquid heat exchanger operably connected to the separator to accept the substantially liquid phase from the separator and exchange at least a portion of the heat contained in said substantially liquid phase to a working fluid thereby producing a heated working fluid capable of converting energy;
 e) one or more pipes operably connected to the vapor heat exchanger, the liquid heat exchanger, or both to transfer the heated working fluid that is capable of converting energy to a source capable of using said energy.

23. The apparatus of claim 22 further comprising deoxygenation system operably connected (1) between the separator and the vapor heat exchanger and (2) between the separator and the liquid heat exchanger.

24. The apparatus of claim 22 wherein at least one of the heat exchangers comprises a welded metal plate exchanger.

25. The apparatus of claim 22 wherein at least one of the heat exchangers comprises a shell and tube exchanger.

26. The apparatus of claim 22 wherein at least one of the heat exchangers comprises a spiral heat exchanger.

27. The apparatus of claim 22 wherein the liquid heat exchanger and the vapor heat exchanger operate independently of one another.

28. An apparatus for generating a heated working fluid that is capable of converting energy comprising:
 a) a gathering device capable of producing a heat containing fluid comprising one or more hydrocarbons; b) one or more welded plate heat exchangers operably connected to the gathering device to accept the heat containing fluid and exchange at least a portion of the heat contained in said heat containing fluid to a useful energy source in a closed loop system;
 e) one or more links operably connected to the one or more heat exchangers to transfer the useful energy source to an apparatus or process in need of energy.

* * * * *